United States Patent
Kim

(10) Patent No.: US 11,208,085 B2
(45) Date of Patent: Dec. 28, 2021

(54) AUTOMOTIVE BRAKING CONTROL SYSTEM, APPARATUS, AND METHOD CONSIDERING WEATHER CONDITION

(71) Applicant: Mando Corporation, Pyeongtaek-si (KR)

(72) Inventor: Doo Kyum Kim, Hwaseong-si (KR)

(73) Assignee: Mando Corporation, Pyeongtaek-si (KR)

( * ) Notice: Subject to any disclaimer, the term of this patent is extended or adjusted under 35 U.S.C. 154(b) by 314 days.

(21) Appl. No.: 16/263,853

(22) Filed: Jan. 31, 2019

(65) Prior Publication Data

US 2019/0248347 A1 Aug. 15, 2019

(30) Foreign Application Priority Data

Feb. 9, 2018 (KR) ........................ 10-2018-0016495

(51) Int. Cl.
*B60T 8/1755* (2006.01)
*B60T 7/22* (2006.01)
(Continued)

(52) U.S. Cl.
CPC ............ *B60T 8/17558* (2013.01); *B60T 7/22* (2013.01); *B60W 30/09* (2013.01);
(Continued)

(58) Field of Classification Search
CPC .. B60T 8/17558; B60T 7/22; B60T 2201/022; B60T 2210/30; B60T 2210/32;
(Continued)

(56) References Cited

U.S. PATENT DOCUMENTS 9,718,405 B1 * 8/2017 Englander ................. B60R 1/00
10,392,013 B2 * 8/2019 Hakki ....................... B60Q 1/50
(Continued)

FOREIGN PATENT DOCUMENTS

CN 103863321 B * 6/2017 ........... G01S 13/931
CN 107364390 A * 11/2017 ............... B60Q 1/30
(Continued)

OTHER PUBLICATIONS

Xiangkun et al., "Autonomous Emergency Braking based on Radial Basis Function Neural Network Variable Structure Control for Collision Avoidance," 2017, Publisher: IEEE.*
(Continued)

*Primary Examiner* — Tuan C To
(74) *Attorney, Agent, or Firm* — Morgan, Lewis & Bockius LLP

(57) ABSTRACT

The present disclosure relates to an automotive braking control apparatus and method. The automotive braking control apparatus includes: a weather condition determiner determining weather conditions on the basis of image information received from a camera; a collision determiner determining possibility of a collision with a forward object on the basis of the image information received from the camera and object sensing information received from a radar; and an automotive braking controller controlling emergency braking of a vehicle when it is determined that there is possibility of a collision with the forward object, in which the collision determiner changes weight for the image information and weight for the object sensing information on the basis of the weather conditions.

12 Claims, 5 Drawing Sheets

(51) Int. Cl.
  *B60W 30/09* (2012.01)
  *B60W 30/095* (2012.01)
  *G08G 1/16* (2006.01)

(52) U.S. Cl.
  CPC ......... *B60W 30/0956* (2013.01); *G08G 1/166* (2013.01); *B60T 2201/022* (2013.01); *B60T 2210/30* (2013.01); *B60T 2210/32* (2013.01); *B60W 2555/20* (2020.02)

(58) Field of Classification Search
  CPC ............ B60W 30/09; B60W 30/0956; B60W 2555/20; G08G 1/166
  USPC .......................................................... 701/70
  See application file for complete search history.

(56) References Cited

U.S. PATENT DOCUMENTS

| | | | | |
|---|---|---|---|---|
| 2003/0025597 | A1* | 2/2003 | Schofield | G06K 9/6267 340/435 |
| 2006/0060441 | A1* | 3/2006 | Sakai | B60B 39/02 191/2 |
| 2008/0147253 | A1* | 6/2008 | Breed | G01S 17/93 701/3 |
| 2009/0244086 | A1* | 10/2009 | Miyasaka | H04N 13/354 345/589 |
| 2014/0207355 | A1* | 7/2014 | Akaho | B60T 8/17616 701/71 |
| 2016/0203719 | A1* | 7/2016 | Divekar | B60T 7/18 701/70 |
| 2016/0221581 | A1* | 8/2016 | Talwar | B60W 30/00 |
| 2016/0231746 | A1* | 8/2016 | Hazelton | G01S 13/867 |
| 2017/0101056 | A1* | 4/2017 | Park | B60R 1/00 |
| 2018/0060674 | A1* | 3/2018 | Zhao | G06K 9/6293 |
| 2019/0078896 | A1* | 3/2019 | Zhu | G08G 1/0129 |
| 2019/0206261 | A1* | 7/2019 | Szymczak | B60W 30/165 |

FOREIGN PATENT DOCUMENTS

| | | | | |
|---|---|---|---|---|
| GB | 2291946 A | * | 2/1996 | ............. B60T 8/489 |
| JP | 2007-255979 A | | 10/2007 | |
| JP | 2017134518 A | * | 8/2017 | ........ B60W 30/0956 |
| KR | 10-2016-0067499 A | | 6/2016 | |
| KR | 20160067499 A | * | 6/2016 | |
| KR | 20170077317 A | * | 7/2017 | |
| KR | 20170081375 A | * | 7/2017 | ......... B60R 21/0134 |
| KR | 20170127741 A | * | 11/2017 | ............... B60Q 1/44 |
| WO | WO-2012080005 A1 | * | 6/2012 | ......... B60R 16/0237 |
| WO | WO-2015159666 A1 | * | 10/2015 | ......... H01L 27/3239 |

OTHER PUBLICATIONS

R. Avinash et al., "Investigation of Pedestrian Collision Avoidance with Auto Brake," 2017, Publisher: IEEE.*
Alberto et al., "Analysis of the Braking Behaviour in Pedestrian Automatic Emergency Braking," 2015, Publisher: IEEE.*
Korean Office Action dated Nov. 1, 2018 issued in Korean Patent Application No. 10-2018-0016495.

* cited by examiner

AUTOMOTIVE BRAKING CONTROL SYSTEM, APPARATUS, AND METHOD CONSIDERING WEATHER CONDITION

CROSS REFERENCE TO RELATED APPLICATION

This application claims priority from Korean Patent Application No. 10-2018-0016495, filed on Feb. 9, 2018, which is hereby incorporated by reference for all purposes as if fully set forth herein.

BACKGROUND OF THE INVENTION

1. Field of the Invention

The present disclosure relates to an automotive braking control system, apparatus, and method. In detail, the present disclosure relates to an automotive braking control system, apparatus, and method of determining weather conditions such as rainfall, heavy snowfall, or fog, determining information for sensing a possibility of a collision with a forward object in accordance with the weather conditions, and controlling emergency braking of a vehicle when determining there is a possibility of a collision with a forward object.

2. Description of the Prior Art

With the development of a self-driving vehicle, an automotive braking control apparatus that determines possibility of a collision with a forward object (e.g., another vehicle, an object, and a pedestrian) using information received from a camera and a radar even without input by a user and performs emergency braking when determining there is a possibility of a collision with a forward object has been introduced.

Such an automotive braking control apparatus uses only factors such as the speed of a subject vehicle and a relative speed between the subject vehicle and a forward object without considering weather conditions such as rainfall and heavy snowfall when determining possibility of a collision with the forward object to perform emergency braking.

Further, when the automotive braking control apparatus uses both of a camera and a radar to recognize a forward object, the apparatus equally sets weight for image information received from the camera and wet object sensing information received from the radar, recognizes a forward object, and determines possibility of a collision with a forward object on the basis of the information.

However, the friction coefficient between a vehicle and road surface is reduced and the braking distance increases in weather conditions such as rainfall or heavy snowfall, in comparison to clear weather, so even if a collision is expected and emergency braking of a vehicle is performed, a collision with a forward object may occur.

Further, a radar can normally sense a forward object in weather conditions such as rainfall, heavy snowfall, or fog, but a camera cannot obtain accurate image information about a forward object due to the influence of the weather conditions. Accordingly, in weather conditions such as rainfall, heavy snowfall, and fog, it is required to change the weight for the image information received from a camera and the weight for object sensing information received from a radar in order to accurately check existence of a forward object, and accordingly, it is possible to accurately determine the possibility of a collision with a forward object.

SUMMARY OF THE INVENTION

Accordingly, the preset disclosure provides an automotive braking control system, apparatus, and method being able to control emergency braking of a vehicle by accurately determining possibility of a collision with a forward object even in weather conditions such as rainfall, heavy snowfall, and fog.

In accordance with an aspect of the present disclosure, there is provided an automotive braking control system including: a camera module disposed on a vehicle to have a visual field inside or outside the vehicle and configured to capture image data and process the captured image data; at least one non-image sensor module disposed on the vehicle to have a visual field inside or outside the vehicle and configured to capture sensing data and process the captured sensing data; and a control unit configured to perform processing at least partially based on processing of the image data and the sensing data, in which the control unit includes: a weather condition determiner that determines weather conditions on the basis of the image data processed by the camera module; a collision determiner that determines possibility of a collision with a forward object on the basis of image information from the image data processed by the camera module and object sensing information from the sensing data processed by the non-image sensor module; and a automotive braking controller that controls emergency braking of the vehicle when it is determined that there is possibility of a collision with the forward object, in which the collision determiner changes weight for the image information or weight for the object sensing information on the basis of the weather conditions.

In accordance with another aspect of the present disclosure, there is provided an automotive braking control system including: a camera module disposed on a vehicle to have a visual field inside or outside the vehicle and configured to capture image data and process the captured image data; at least one non-image sensor module disposed on the vehicle to have a visual field inside or outside the vehicle and configured to capture sensing data and process the captured sensing data; an emergency braking system module configured to perform emergency braking on the basis of relative speeds and a spaced distance of the vehicle and an object existing in front of the vehicle; and a domain control unit configured to process the captured image data and sensing data and control at least one driver assist system module in the vehicle including the emergency braking system, in which the domain control unit determines weather conditions on the basis of the image data; determines possibility of a collision with a forward object on the basis of image information from the image data and object sensing information from the sensing data; and controls emergency braking of the vehicle when determining that there is possibility of a collision with the forward object, and the domain control unit changes weight for the image information and weight for the object sensing information on the basis of the weather conditions.

In accordance with another aspect of the present disclosure, there is provided an automotive braking control apparatus including: a weather condition determiner determining weather conditions on the basis of image information received from a camera; a collision determiner determining possibility of a collision with a forward object on the basis of the image information received from the camera and object sensing information received from a radar; and a automotive braking controller controlling emergency braking of a vehicle when it is determined that there is possibility of a collision with the forward object, in which the collision determiner changes weight for the image information and weight for the object sensing information on the basis of the weather conditions.

In accordance with another aspect of the present disclosure, there is provided an automotive braking control method including: a weather condition determination step of determining weather conditions on the basis of image information received from a camera; a collision determination step of determining possibility of a collision with a forward object on the basis of the image information received from the camera and object sensing information received from a radar; and a control step of controlling emergency braking of a vehicle when it is determined that there is possibility of a collision with the forward object, in which the collision determination step changes weight for the image information and weight for the object sensing information on the basis of the weather conditions.

In accordance with another aspect of the present disclosure, there is provided a camera module including: an image sensor disposed on a vehicle to have a visual field inside or outside the vehicle and configured to capture image data; and a processor configured to process the image data captured by the image sensor, in which the image data is used to determine weather conditions; and determine possibility of a collision with a forward object together with object sensing information of sensing data processed by a non-image sensor module disposed on the vehicle to have a sensing area inside or outside the vehicle and configured to capture sensing data; weight for image information from the image data or weight for object sensing information from the sensing data is changed on the basis of the determined weather condition; and emergency braking of the vehicle is controlled when it is determined that there is possibility of a collision with the forward object.

According to the present disclosure, it is possible to increase reliability in emergency braking of a vehicle by accurately determining possibility of a collision with a forward object even in weather conditions such as rainfall, heavy snowfall, and fog.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
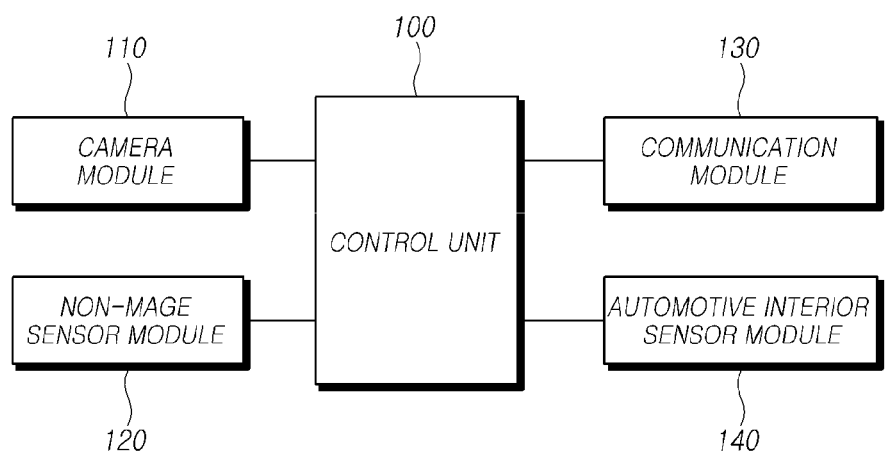
FIG. 1 is a block diagram of a vehicle according to an embodiment.

Hereinafter, embodiments of the present disclosure will be described in detail with reference to the accompanying drawings. In the following description, the same components will be designated by the same reference numerals although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

A vehicle may be a concept including a car and a motor cycle in this specification. Further, the vehicle may be a concept including all of an internal combustion engine vehicle having an engine as a power source, a hybrid vehicle having an engine and an electric motor as power sources, and an electric vehicle having an electric motor as a power source. A car is exemplified as the vehicle in the following description.

The term "forward" means the forward-driving direction of a vehicle and the term "rearward" means the rearward-driving direction of a vehicle. Further, the term "left" of a vehicle means the left side in the forward-driving direction of a vehicle and the term "right" of a vehicle means the right side in the forward-driving direction of a vehicle. Further, the term "rear-cross area" of a vehicle means the left side or the right side in the rearward-driving direction of the vehicle.

FIG. 1 is a block diagram of a vehicle according to an embodiment.

Referring to FIG. 1, a vehicle may include a control unit 100, a camera module 110, a non-mage sensor module 120, a communication module 130, and an automotive interior sensor module 140.

For example, the camera module 110 may include an image sensor configured to have a visual field inside or outside a vehicle and capturing image data and a processor configured to process the captured image data.

For example, the image sensor may be disposed on a vehicle to have a visual field inside or outside the vehicle. At least one image sensor can be mounted at a predetermined position on the vehicle to secure visual fields for the front and rear area of the vehicle.

Image information obtained from the image sensor is configured in image data, so it may mean image data captured by the image sensor. In the present disclosure, the image information taken from the image sensor means image data captured by the image sensor. The image data captured by the image sensor, for example, may be produced in one format of AVI of a Raw format, MPEG-4, H.264, DivX, and JPEG.

The image data captured by the image sensor can be processed by the processor. The processor can be operated to process the image data captured by the image sensor.

The processor can be achieved, as hardware, by at least one of electric units that can process image data and perform other functions such as Application Specific Integrated Circuits (ASICs), Digital Signal Processors (DPSs), Digital Signal Processing Devices (DSPDs), Programmable Logic Devices (PLDs), Field Programmable Gate Arrays (FPGAs), controllers, micro-controllers, and microprocessors.

The non-image sensor module 120 means another sensor module except for the camera module 110 that captures images. For example, a plurality of non-image sensors 120 may be disposed on a vehicle to have a visual field inside or outside the vehicle and can capture sensing data. The non-image sensors 120, for example, may be radar sensors, lidar sensors, and ultrasonic sensors. The non-image sensor module 120 may not be provided or one or more non-image sensor modules 120 may be provided.

The communication module 130 performs a function for vehicle-to-vehicle, vehicle-to-infrastructure, vehicle-to-server, and internal vehicle communication etc. To this end, the communication module 130 may be composed of a transmission module and a reception module. For example, the communication module 130 may include a broadcasting reception module, a wireless internet module, a near field communication module, a location information module, an optical communication module, and a V2X communication module.

The broadcasting reception module receives broadcasting signals or broadcasting-related information from an external broadcasting management server through broadcasting channels. The broadcasting includes at least one of radio broadcasting and TV broadcasting. The wireless internet module is a module for wireless internet connection and may be provided inside or outside a vehicle. The near field communication module, which is for short range communication, can support short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB).

The geographic information module is a module for obtaining location information of a vehicle and a Global Positioning System (GPS) module is a representative example. For example, when a vehicle is equipped with a GPS module, it can obtain its location using a signal from a GPS satellite. Meanwhile, depending on embodiments, the location module may be a component not included in the communication module 130, but included in the automotive interior sensor module 140.

The optical communication module may include an optical transmitter and an optical receiver. The optical transmitter and optical receiver can transmit and receive information by converting light signals into electrical signals.

The V2X communication module is a module for wireless communication with a server, another vehicle, or an infrastructure device. In this embodiment, the V2X communication module means exchange of information between a vehicle and an object such as another vehicle, a mobile device, or a road through wire/wireless networks or the technology. The V2X communication module may include the concepts of Vehicle to Vehicle (V2V) communication, Vehicle to Infrastructure (V2I) communication, Vehicle to Nomadic Device (V2N) communication, and Vehicle to Pedestrian (V2P) communication. The V2X communication module is based on Dedicated Short-Range Communications (DSRC) and can use IEEE Wireless Access in Vehicular Environment (WAVE) or IEEE 802.11p communication technology using a band of 5.9 GHz, but is not limited thereto and should be understood as including all kinds of V2V communication developed at present or in future.

The automotive interior sensor module 140 means a sensor for sensing interior information of a vehicle. For example, the automotive interior sensor module 140 may mean a torque sensor for sensing steering torque, a steering angle sensor for sensing a steering angle, a motor position sensor that senses information about a steering motor, a vehicle speed sensor, a vehicle motion sensor that senses movement of a vehicle, and a vehicle posture sensor. Further, the automotive interior sensor module 140 may mean sensors for sensing various data in a vehicle other than the above sensors and one or more automotive interior sensor modules may be provided.

The control unit 100 can obtain data from at least one of the camera module 110, the non-mage sensor module 120, the communication module 130, and the automotive interior sensor module 140 and can control various operations of a vehicle on the basis of the obtained data. Alternatively, the control unit 100 can obtain and process image data from the camera module 110. Further, the control unit 100 can receive and process sensing data from the non-mage sensor module 120. Alternatively, the control unit 100 can obtain and process data from the automotive interior sensor module 140 or the communication module 130. To this end, the control unit 100 may include at least one processor.

Further, the control unit 100 can control the operation of at least one of the camera module 110, the non-mage sensor module 120, the communication module 130, and the automotive interior sensor module 140. Alternatively, the control unit 100 can control the operation of various driver assist systems in a vehicle.

A radar sensor or a radar system that is used in the present disclosure may include at least one radar sensor unit, for example, one or more of a front radar sensor disposed on the front of a vehicle, a rear radar sensor disposed on the rear of the vehicle, and a side or rear-cross radar sensor disposed on the sides of a vehicle. The radar sensor or radar sensor system processes data by analyzing transmission signals or reception signals, so it can detect information about objects and may include an Electronic Control Unit (ECU) or a processor for the detection. A communication link such as an appropriate automotive network buss may be used for data or signal transmission from the radar sensor to the ECU.

The radar sensor includes one or more transmitting antennas that transmit radar signals and one or more receiving antennas that receive reflecting signals from an object.

The radar antenna according to the embodiment may employ a multi-antenna arrangement and Multiple Input Multiple Output (MIMO) signal transmission/reception method to form a virtual antenna aperture larger than the actual antenna aperture.

For example, a 2D-antenna array is used to secure precision and resolution of horizontal and vertical angles. By using a 2D-antenna array, it is possible to transmit/receive signals through two-time separate (time-multiplexed) horizontal and vertical scanning and to use MIMO separately from 2D-radar horizontal and vertical scanning (time multiplexing).

In detail, the radar antenna of the embodiment may employ a 2D-antenna array composed of a transmitting antenna unit including a total of twelve antennas Tx and a receiving antenna unit including a total of sixteen receiving antennas Rx, and as a result, it may have a total of one hundred and ninety two virtual receiving antennas.

The transmitting antenna unit includes three transmitting antenna groups each including four transmitting antennas, in which a first transmitting antenna group may be vertically spaced part a predetermined distance from a second transmitting antenna group and the first or second transmitting antenna group may be horizontally spaced apart a predetermined distance D from a third transmitting antenna group.

The receiving antenna unit may include four receiving antenna groups each including four receiving antennas, in which the receiving antenna groups are vertically spaced apart from one another. Further, the receiving antenna unit may be disposed between the horizontally spaced first and third transmitting antenna groups.

In another embodiment, antennas of the radar sensor are arranged in a 2D-antenna array, and for example, each antenna patch has Rhombus lattice arrangement, thereby being able to reduce unnecessary lobes.

Alternatively, the 2D-antenna arrangement may include a V-shape antenna array in which a plurality of radial patches are arranged in a V-shape, and in detail, may include two V-shape antenna arrays. In this configuration, a single feed is achieved by the apex of each V-shape antenna array.

Alternatively, the 2D-antenna arrangement may include an X-shape antenna array in which a plurality of radial patches are arranged in an X-shape, and in detail, may include two X-shape antenna arrays. In this configuration, a single feed is achieved by the center of each X-shape antenna array.

A MIMO antenna system may be used for the radar sensor according to the embodiment to secure vertical and horizontal sensing accuracy or resolution.

In detail, in a MIMO system, each of transmitting antennas can transmit signals that have independent different waveforms. That is, the transmitting antennas each transmit a signal having an independent waveform different from those of the other transmitting antennas, so receiving antennas can determine which transmitting antennas the reflecting signals that are reflected by an object are transmitted from due to the different waveforms.

The radar sensor according to the embodiment may include a substrate including a transmitting/receiving antenna, a radar housing accommodating a circuit, and a radome forming the external shape of the radar housing. The radome is made of a material that can reduce attenuation of transmitted and received radar signals and may be formed as a front or rear bumper, a grill, of a side of a vehicle, or the outer surface of an automotive part.

That is, the radome of the radar sensor may be disposed inside a grill, a bumper, or a body of a vehicle or may be formed as a portion of a part forming the outer surface of a vehicle such as a grill, a bumper, and a portion of the body of a vehicle, thereby being able to improve the aesthetic appearance of the vehicle and convenience of mounting the radar sensor.

The lidar may include a laser transmitter, a receiver, and a processor. The lidar may be implemented in a Time of Flight (TOF) type or a phase-shift type.

A TOF type lidar emits a laser pulse signal and receives a reflection pulse signal reflected by an object. The lidar can measure the distance to an object on the basis of the emission time of a laser pulse signal and the reception time of a reflection pulse signal. The phase-shift type lidar can measure a relative speed to the object on the basis of a change in distance to time.

A phase-shift type lidar can emit a laser beam that is continuously modulated with a specific frequency and can measure time and the distance to an object on the basis of a change in phase of a signal reflected back by an object. The phase-shift type lidar can measure a relative speed to the object on the basis of a change in distance to time.

A lidar can detect an object on the basis of a transmitted laser and can detect a relative speed and the distance to the detected object. When the object is a static object (e.g., a tree, a street light, a traffic light, and a traffic sign), the lidar can detect the running speed of a vehicle on the basis of TOF by the object.

The ultrasonic sensor may include an ultrasonic transmitter, a receiver, and a processor.

An ultrasonic sensor can detect an object on the basis of a transmitted ultrasonic wave and can detect a relative speed and the distance to the detected object. When the object is a static object (e.g., a tree, a street light, a traffic light, and a traffic sign), the ultrasonic sensor can detect the running speed of a vehicle on the basis of TOF by the object.

Figure 2:
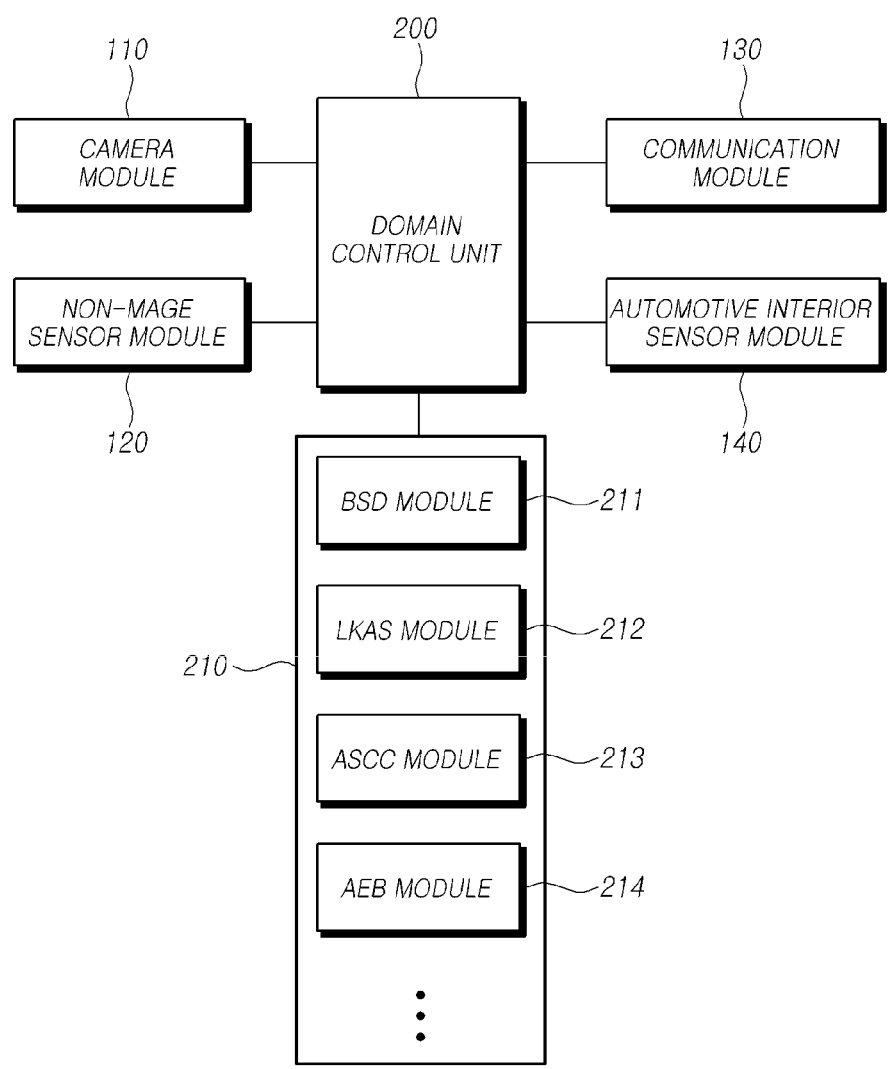
FIG. 2 is a block diagram of a vehicle according to another embodiment.

FIG. 2 is a block diagram of a vehicle according to another embodiment.

Referring to FIG. 2, a vehicle may include at least one of the camera module 110, the non-mage sensor module 120, the communication module 130, and the automotive interior sensor module 140. They were described with reference to FIG. 1, so they are not described here.

The vehicle may further include a Domain Control Unit (DCU) 200.

The DCU 200 may be configured to receive captured image data from at least one image sensor, receive captured sensing data from a plurality of non-image sensors, and process at least one of the image data and the sensing data. For this processing, the DCU 200 may include at least one processor.

The DCU 200 can transmit/receive data to/from at least one of the camera module 110, the non-mage sensor module 120, the communication module 130, the automotive interior sensor module 140, and a driver assist system module 210 and can process the data received from the at least one of the modules. That is, the DCU 200 can be disposed in a vehicle and can communicate with at least one module in the vehicle. To this end, the DCU 200 may further include an appropriate data link or communication link such as a vehicle network bus for data transmission or signal communication.

The DCU 200 can be operated to control one or more of several Driver Assist Systems (DAS) that are used for vehicles. For example, the DCU 200 can determine a specific situation, a condition, occurrence of an event, and control operation performance on the basis of data obtained from at least one of the modules 110, 120, 130, 140, and 210.

The DCU 200 can transmit signals for controlling the operations of various DAS modules 210 disposed in a vehicle using the determined information. For example, the DAS module 210 may include a Blind Spot Detection (BSD) system module 211, a Lane Keeping Assist System (LKAS) module 212, an Adaptive Smart Cruise Control (ASCC) system module 213, an Autonomous Emergency Braking (AEB) system module 214. Further, the DAS module 210 in a vehicle may be implemented in other various systems such as a Lane Departure Warning System (LDWS), a Lane Change Assist System (LCAS), and a Parking Assist System (PAS). The term and name "DAS" are an example and the present disclosure is not limited thereto. Further, the DAS module 210 may include a self-driving module for self-driving. Alternatively, the DCU can control a vehicle to perform self-driving by controlling the system modules included in the DAS module 210.

When it is determined that there is an object in front of a vehicle that is driving at least partially on the basis of the data captured by the camera module and the non-image sensor module, the AEB 214 performs emergency braking on the basis of the relative speeds of the object and the vehicle and the distance to the object regardless of braking by a driver.

Figure 3:
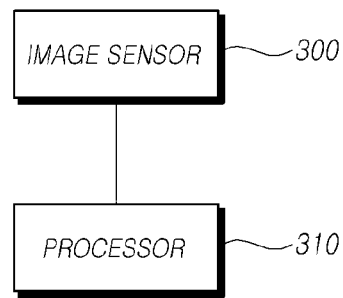
FIG. 3 is a block diagram illustrating a camera module that is mounted on a vehicle.

FIG. 3 is a block diagram illustrating a camera module that is mounted on a vehicle.

Referring to FIG. 3, the camera module 110 may be composed of an image sensor 300 and a processor 310.

The image sensor 300 may mean a device that converts light (image information) received through a camera lens into an electrical digital signal. For example, the image sensor 300 may mean a Charge Coupled Device (CCD) image sensor that directly transmits signals of an electron format. Alternatively, the image sensor 300 may mean a Complementary Metal Oxide Semiconductor (CMOS) image sensor that converts and transmits signals in a voltage format.

As described above, the image sensor 300 may be disposed on a vehicle to have a visual field inside or outside the vehicle. Further, at least one image sensor 300 may be mounted on a vehicle to have a front, side, or rear visual field.

Image data captured by the image sensor 300 can be produced, for example, in one format of AVI, MPEG-4, H.264, DivX, and JPEG of a Raw format. The image data captured by the image sensor 300 can be processed by the processor 310.

The processor 310 can be operated to process the image data captured by the image sensor 300. For example, image data can be processed by the processor included in the camera module. Alternatively, image data may be processed by the control unit 100 or the DCU 200.

For example, the processor 310 can process data red by the image sensor 300 into high-quality images through several calculation processes. If necessary, the processor 310 may perform target sensing, distance measuring, and target classifying by processing image data.

The image data can be used to determine weather conditions and determine possibility of a collision with a forward object together with object sensing information of sensing data processed by the non-image sensor module disposed on a vehicle to have a sensing area inside or outside the vehicle and configured to capture sensing data. Weight for image information from the image data or weight for object sensing information from the sensing data can be changed on the basis of the determined weather condition. When it is determined that there is possibility of a collision with a forward object, emergency braking of a vehicle is controlled.

The terms of the components described above and exemplary description of the components are provided for convenience of understanding and the present disclosure is not limited to the terms and description. The terms described above may be changed in the following description to more clearly described embodiments of the present disclosure. Further, the configuration of a vehicle described with reference to FIGS. 1 to 3 are an example and components may be changed, added, or removed below to more clearly describe the spirit of the present disclosure.

In general, an automotive braking control apparatus calculates time to collide with a forward object and then determine the point of time to perform emergency braking on the basis of the speed of a subject vehicle and a relative speed to the forward object. In this case, when the friction coefficient between tires and a road surface is a predetermined coefficient or larger, such as a clear day, an automotive braking control apparatus can secure reliable operation. However, when the friction coefficient between tires and a road surface decreases and the state of the road is poor for braking, such as in a rainy or heavy snowy day, the possibility of a collision with a forward object increases even though an automotive braking control apparatus normally operates and perform emergency braking.

Further, when recognizing a forward object using a camera in a foggy day, a common automotive braking control apparatus has high possibility of colliding with the forward object due to the fog even though a forward object actually exists. Accordingly, when using a radar, the possibility of a common automotive braking control apparatus determining that there is no forward object by mistake increases due to the forward object recognition information from a camera in spite of being able to normally recognizing the forward object without being influenced by fog.

Accordingly, the preset disclosure provides an automotive braking control apparatus able to improve reliability in emergency braking of a vehicle by accurately determining possibility of a collision with a forward object even in weather conditions such as rainfall, heavy snowfall, and fog.

An embodiment of the present disclosure is described hereafter in detail with the drawings.

Figure 4:
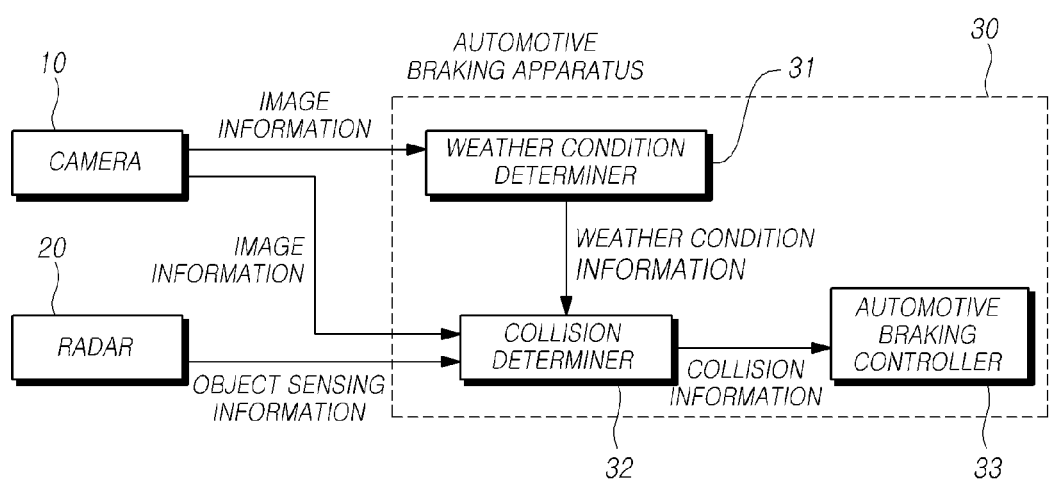
FIG. 4 is a diagram showing the configuration of an automotive braking control apparatus according to an embodiment.

FIG. 4 is a diagram showing the configuration of an automotive braking control apparatus according to an embodiment.

Referring to FIG. 4, an automotive braking control apparatus 30 may include a weather condition determiner 31, a collision determiner 32, and an automotive braking controller 33.

The weather condition determiner 31 can determine weather conditions on the basis of image information received from a camera 10.

For example, the weather condition determiner 31 can determine whether weather conditions correspond to one of rainfall, heavy snowfall, and fog on the basis of the image information received from the camera 10.

As will be described below, when it is determined that the weather conditions correspond to one of rainfall, heavy snowfall, and fog, the operation related to braking of a vehicle may be changed, so it is possible to inform a driver of weather condition information through a Human Machine Interface (HMI).

The collision determiner 32 can determine possibility of a collision with a forward object on the basis of the image information received from the camera 10 and the object sensing information received from a radar 20. That is, the collision determiner 32 can determine possibility of a collision with a forward object by extracting recognition information about a forward object on the basis of the image information received from the camera 10, extracting recognition information about the forward object on the basis of the object sensing information received from the radar 20, combining the two items of information, recognizing the forward object, and executing a predetermined logic for determining whether there is possibility of a collision.

The collision determiner 32 can receive weather condition information from the weather condition determiner 31 and can change weight for the image information received from the camera 10 or weight for the object sensing information received from the radar 20 on the basis of the received weather condition information.

If the weight for the image information received from the camera 10 is increased, the collision determiner 32 determines possibility of a collision with a forward object first on the basis of the information from the camera 10. Further, if the weight for the object sensing information received from the radar 20 is increased, the collision determiner 32 determines possibility of a collision with a forward object first on the basis of the information from the radar 20.

Under common conditions, that is, during a clear day, the collision determiner 32 may equally set the weight for the image information received from the camera 10 and the weight for the object sensing information received from the radar 20. That is, it is possible to set weight of 50% for the forward object recognition result based on the image information received from the camera 10 and set weight of 50% for the forward object recognition result based on the object sensing information received from the radar 20.

However, when a forward object is recognized on the basis of the image information received from the camera 10 in rainfall, heavy snowfall, and fog, there is possibility of recognizing that there is no forward object due to rain, snow, and fog despite that there is actually a forward object. However, the radar 20 uses high-frequency signals, so it is not influenced by weather conditions, and accordingly, it has high possibility of accurately recognizing a forward object.

Therefore, in rainfall, heavy snowfall, and fog, the possibility of accurately recognizing a forward object when increasing weight for the object sensing information received from the radar 20 rather than equally setting the weight for the image information received from the camera 10 or weight for the object sensing information received from the radar 20.

For example, in rainfall, heavy snowfall, and fog, it is possible to set weight of 10% lower than 50% for the forward object recognition result based on the image information received from the camera 10 and set weight of 90% higher than 50% for the forward object recognition result based on the object sensing information received from the radar 20. In this case, since it is possible to recognize a forward object using the object sensing information received from the radar 20 having high weight although not recognizing the forward object from the image information received from the camera 10, so it is possible to solve the problem of not recognizing a forward object.

Accordingly, when it is determined that the weather condition corresponds to one of rainfall, snowfall, and fog, the collision determiner 32 can increase the weight for the object sensing information received from the radar 20.

In an embodiment, the automotive braking control apparatus can measure the amount of rainfall or the amount of snowfall on the basis of the sensing information from an automotive interior sensor or image information from the camera 10. Accordingly, when the weather condition is rainfall or snowfall, the collision determiner 32 can determine the weight for image information and the weight for object sensing information in accordance with the amount of rainfall or the amount of snowfall.

In another embodiment, the automotive braking control apparatus can estimate the intensity of rainfall or heavy snowfall by sensing the speed of the wipers of a vehicle. The collision determiner 32 can determine the weight for image information and the weight for object sensing information on the basis of the sensed speeds of the wipers.

In an embodiment, the automotive braking control apparatus can calculate a visibility distance on the basis of image information received from the camera 10. The visibility is an index of the degree of turbidity of the atmosphere and the visibility distance indicates the maximum distance at which objects can be horizontally recognized. The collision determiner 32 determines the state of weather conditions on the basis of the calculated visibility distance. For example, when the weather condition is fog, the collision determiner 32 can determine the intensity of fog on the basis of the calculated visibility distance. Further, the collision determiner 32 can determine the weight for image information and the weight for object sensing information on the basis of the intensity of fog.

In an embodiment, the automotive braking control apparatus can store the possibility of a collision determined on the basis of the information recognized through the automotive interior sensor, the camera, or the radar, the ratio of the weight for image information and weight for object sensing information in a corresponding situation, and information of whether to perform emergency braking. The stored information can be selectively used to determine possibility of a collision, the ratio of the weights for image information and object sensing information, and whether to perform emergency braking when the vehicle is in the same or similar weather condition. The process can be performed in deep learning.

When it is determined that the weather condition corresponds to one of rainfall and heavy snowfall, the collision determiner 32 can increase a critical braking distance.

The critical braking distance means a minimum braking distance at which it is determined that a vehicle can avoid a collision with a forward object when performing emergency braking on the basis of the current speed of the vehicle and the relative speed between the vehicle and the forward object. Accordingly, when the distance between a subject vehicle and forward object is the critical braking distance or less, the collision determiner 32 can determine that there is possibility of a collision with the forward object and can control emergency braking of the vehicle.

When the critical braking distance is increased, it is possible to reduce the possibility of a collision with a forward object in emergency braking of a vehicle even if the road surface is slippery due to rainfall or heavy snowfall. However, in this case, since a driver can more sensitively feel emergency braking control of a vehicle in comparison to common conditions, that is, during clear weather, so it is required to inform the driver of a change in emergency braking control of the vehicle.

When the weather condition is rainfall or heavy snowfall, rain or snow is collected on a road surface, so the friction coefficient between tires and the road surface decreases in comparison to during clear weather. Accordingly, the braking distance when a vehicle is braked at the same speed of the subject vehicle and the same relative speed between the subject vehicle and a forward object is increased in comparison to during clear weather. Accordingly, there is possibility of a vehicle colliding with a forward object against driver's intention.

However, when the weather condition is a fog, recognizing a forward object through image information from a camera is influenced, but the friction coefficient between tires and a road surface is not changed. Accordingly, the critical braking distance is not changed.

The degree of change of the critical braking distance may depend on the steps of rainfall or heavy snow fall. That is, the collision determiner 32 can change the distance that is changed in accordance with the step information of rainfall or snowfall instead of uniformly changing the critical braking distance in accordance with a change of the weather condition.

For example, when it is recognized that the weather condition is rainfall step, it is possible to differently determine a first rainfall step when the amount of rainfall is less than a set critical amount of rainfall and determine a second rainfall step when the amount of rainfall is the critical amount of rainfall or more. In this case, the collision determiner 32 can set an increase of the critical braking distance is larger in the second rainfall step than in the first rainfall step.

As another example, when it is recognized that the weather condition is a heavy snowfall step, it is possible to differently determine a first heavy snowfall step when the amount of snowfall is less than a predetermined critical amount of snowfall and determine a second snowfall step when the amount of snowfall is the critical amount of snowfall or more. In this case, the collision determiner 32 can set an increase of the critical braking distance is larger in the second snowfall step than in the first snowfall step.

When the collision determiner 32 determines that there is possibility of a collision with a forward object, the automotive braking controller 33 can control emergency braking of a vehicle on the basis of collision information received from the collision determiner 32. The automotive braking controller 33 may be an electronic Stability Control (ESC) device in a vehicle.

When a driver does not prepare for emergency braking while the automotive braking controller 33 controls emergency braking of a vehicle, unexpected shock may be applied to the driver. Accordingly, it is possible to perform emergency braking or warning through the HMI in order to inform the driver of emergency braking. The warning may be performed by one of sound, haptic, and a lamp.

Communication among the camera 10, the radar 20, the weather condition determiner 31, the collision determiner 32, the automotive braking controller 33, and the HMI can be performed through a vehicle communication network. The vehicle communication network, for example, may be CAN communication, LIN communication, or FlexRay communication.

The description of the components of the control unit 100 and the DCU 200 shown in FIGS. 1 and 2 can be referred to for the components of the automotive braking control apparatus.

Figure 5:
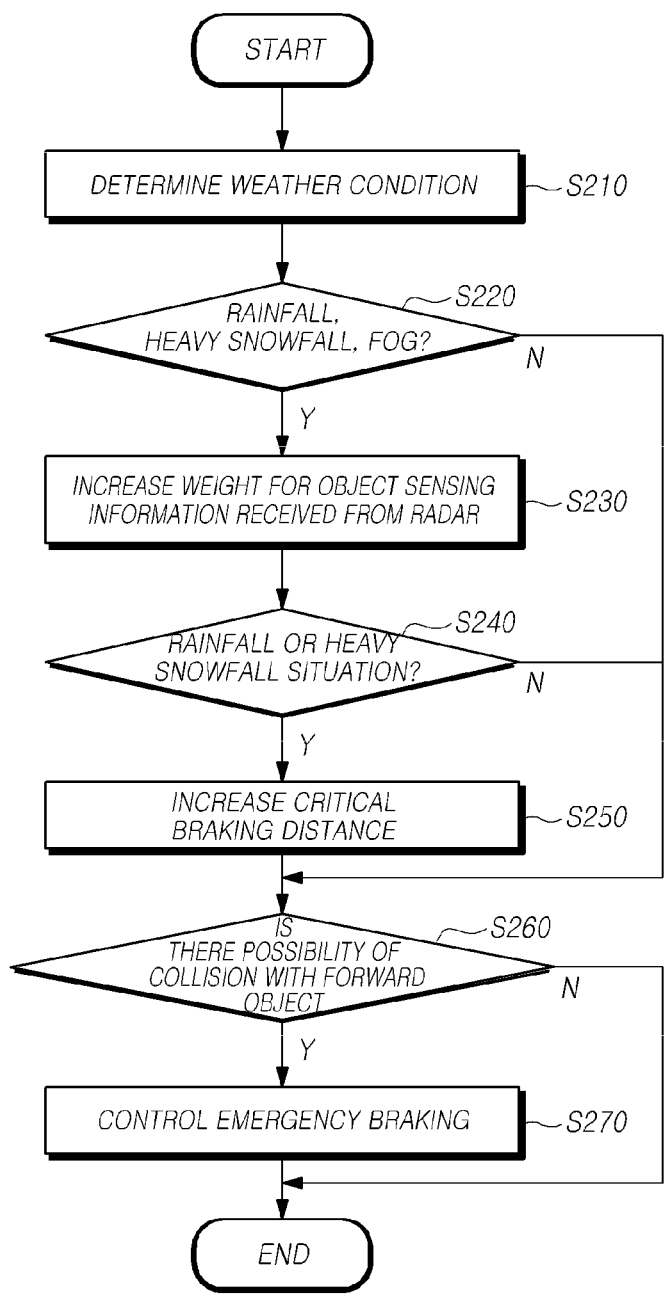
FIG. 5 is a flowchart showing an automotive braking control method according to an embodiment.

FIG. 5 is a flowchart showing an automotive braking control method according to an embodiment.

It is exemplified hereafter that the automotive braking control apparatus 30 described with reference to FIG. 4 performs the automotive braking control method.

Referring to FIG. 5, the weather condition determiner of the automotive braking control apparatus 30 can determine weather conditions on the basis of image information received from the camera.

The collision determiner 32 of the automotive braking control apparatus 30 can determine possibility of a collision with a forward object on the basis of the image information received from the camera and the object sensing information received from the radar. It is possible to change the weight for the image information received from the camera or weight for the object sensing information received from the radar on the basis of the weather condition determined by the weather condition determiner 31.

In detail, the weather condition determiner 31 determines whether the weather condition corresponds to one of rainfall, heavy snowfall, and fog (S220). When the weather condition does not correspond to one of rainfall, heavy snowfall, and fog (S220-N), it is possible to determine possibility of a collision with a forward object without performing specific additional steps.

However, when the weather condition determiner 31 determines that the weather condition corresponds to one of rainfall, heavy snowfall, and fog (S220-Y), the collision determiner 32 of the automotive braking control apparatus can increase the weight for the object sensing information received from the radar 20 (S230).

In an embodiment, the automotive braking control apparatus can measure the amount of rainfall or the amount of snowfall on the basis of the sensing information from an interior vehicle sensor or image information from the camera 10. Accordingly, when the weather condition is rainfall or snowfall, the automotive braking control apparatus can determine the weight for image information and the weight for object sensing information in accordance with the amount of rainfall or the amount of snowfall.

In another embodiment, the automotive braking control apparatus can estimate the intensity of rainfall or heavy snowfall by sensing the speed of the wipers of a vehicle. The automotive braking control apparatus can determine the weight for image information and the weight for object sensing information on the basis of the sensed speeds of the wipers.

In an embodiment, the automotive braking control apparatus can calculate a visibility distance on the basis of image information received from the camera. The visibility is an index of the degree of turbidity of the atmosphere and the visibility distance indicates the maximum distance at which objects can be horizontally recognized. The automotive braking control apparatus determines the state of the weather condition on the basis of the calculated visibility distance. For example, when the weather condition is fog, the automotive braking control apparatus can determine the intensity of fog on the basis of the calculated visibility distance. Further, the automotive braking control apparatus can determine the weight for image information and the weight for object sensing information on the basis of the intensity of fog.

In an embodiment, the automotive braking control apparatus can store the possibility of a collision determined on the basis of the information recognized through the automotive interior sensor, the camera, or the radar, the ratio of the weight for image information and weight for object sensing information in a corresponding situation, and information of whether to perform emergency braking. The stored information can be selectively used to determine possibility of a collision, the ratio of the weights for image information and object sensing information, and whether to perform emergency braking when the vehicle is in the same or similar weather condition. The process can be performed in deep learning.

Thereafter, when the weather condition corresponds to one of rainfall and heavy snowfall s (S240-Y), the collision determiner 32 of the automotive braking control apparatus 30 can increase the critical braking distance (S250). As described above, this is because the friction coefficient between tires and the road surface decreases in comparison to a clear weather when the weather condition is rainfall or heavy snowfall, rain or snow is collected on a road surface. An increase of the critical braking distance, as described above, may depend on step information in rainfall or heavy snowfall situation.

However, when the weather condition does not correspond to one of rainfall and heavy snowfall situations (S240-N), it is possible to determine the possibility of a collision with a forward object without changing the critical braking distance. As described above, this is because recognizing a forward object through image information from a camera is influenced, but the friction coefficient between tires and a road surface is not changed when the weather condition is a fog.

Thereafter, the collision determiner 32 of the automotive braking control apparatus 30 can determine possibility of a collision with a forward object on the basis of the image information received from the camera 10 an the object sensing information received from a radar 20 (S260).

When the collision determiner 32 determines that there is possibility of a collision with a forward object (S260-Y), the automotive braking controller 33 of the automotive braking control apparatus 30 can control emergency braking of the vehicle (S270).

As described above, it is possible to perform emergency braking or warning through an HMI to inform a driver of emergency braking when the automotive braking controller 33 controls emergency braking of the vehicle. The warning may be performed by one of sound, haptic, and a lamp.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

Although the embodiments of the present disclosure have been described for illustrative purposes, those skilled in the art will appreciate that various modifications, additions and substitutions are possible, without departing from the scope and spirit of the disclosure. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. An automotive braking control system comprising:
a camera module disposed on a vehicle to have a visual field inside or outside the vehicle and configured to capture image data and process the captured image data;
at least one non-image sensor module disposed on the vehicle to have a visual field inside or outside the vehicle and configured to capture sensing data and process the captured sensing data; and
a control unit configured to perform processing at least partially based on processing of the image data and the sensing data,
wherein the control unit comprises:
a weather condition determiner that determines weather conditions on the basis of the image data processed by the camera module;
a collision determiner that determines possibility of a collision with a forward object on the basis of image information from the image data processed by the camera module and object sensing information from the sensing data processed by the non-image sensor module; and
an automotive braking controller that controls emergency braking of the vehicle when it is determined that there is the possibility of the collision with the forward object,
wherein the collision determiner changes weight for the image information or weight for the object sensing information on the basis of the weather conditions.

2. The automotive braking control system of claim 1, wherein the collision determiner increases the weight for the object sensing information when it is determined that the weather condition corresponds to one of rainfall, heavy snowfall, and fog.

3. The automotive braking control system of claim 2, wherein the automotive braking control system measures amount of the rainfall or amount of the snowfall or calculates a visibility distance on the basis of the image information, and
the collision determiner determines the weight for the image information and the weight for the object sensing information on the basis of the amount of the rainfall or the amount of the snowfall.

4. The automotive braking control system of claim 1, wherein the collision determiner increases a critical braking distance when it is determined that the weather condition corresponds to one of rainfall and heavy snowfall.

5. The automotive braking control system of claim 4, wherein an increase of the critical braking distance depends on rainfall or heavy snowfall step information.

6. An automotive braking control system comprising:
a camera module disposed on a vehicle to have a visual field inside or outside the vehicle and configured to capture image data and process the captured image data;
at least one non-image sensor module disposed on the vehicle to have a visual field inside or outside the vehicle and configured to capture sensing data and process the captured sensing data;
an emergency braking system module configured to perform emergency braking on the basis of relative speeds and a spaced distance of the vehicle and an object existing in front of the vehicle; and
a domain control unit configured to process the captured image data and sensing data and control at least one driver assist system module in the vehicle comprising the emergency braking system,
wherein the domain control unit
determines weather conditions on the basis of the image data;
determines possibility of a collision with a forward object on the basis of image information from the image data and object sensing information from the sensing data; and
controls the emergency braking of the vehicle when determining that there is the possibility of the collision with the forward object, and
the domain control unit changes weight for the image information and weight for the object sensing information on the basis of the weather conditions.

7. An automotive braking control apparatus comprising:
a weather condition determiner configured for determining weather conditions on the basis of image information received from a camera;
a collision determiner configured for determining possibility of a collision with a forward object on the basis of the image information received from the camera and object sensing information received from a radar; and
an automotive braking controller configured for controlling emergency braking of a vehicle when it is determined that there is the possibility of the collision with the forward object,
wherein the collision determiner changes weight for the image information and weight for the object sensing information on the basis of the weather conditions.

8. An automotive braking control method comprising:
a weather condition determination step of determining weather conditions on the basis of image information received from a camera;
a collision determination step of determining possibility of a collision with a forward object on the basis of the image information received from the camera and object sensing information received from a radar; and
a control step of controlling emergency braking of a vehicle when it is determined that there is the possibility of the collision with the forward object,
wherein the collision determination step changes weight for the image information and weight for the object sensing information on the basis of the weather conditions.

9. The automotive braking control method of claim 8, wherein the collision determination step increases the weight for the object sensing information when it is determined that the weather condition corresponds to one of rainfall, heavy snowfall, and fog.

10. The automotive braking control method of claim 9, further comprising a step of measuring amount of the rainfall or amount of the snowfall or calculating a visibility distance on the basis of the image information, and
the collision determination step determines the weight for the image information and the weight for the object sensing information on the basis of the amount of the rainfall or the amount of the snowfall or the visibility distance.

11. The automotive braking control method of claim 8, wherein the collision determination step increases a critical braking distance when it is determined that the weather condition corresponds to one of rainfall and heavy snowfall.

12. The automotive braking control method of claim 11, wherein an increase of the critical braking distance depends on rainfall or heavy snowfall step information.

* * * * *